United States Patent
Wang et al.

(10) Patent No.: US 11,319,447 B2
(45) Date of Patent: May 3, 2022

(54) PREPARATION METHOD OF ORGANIC SILICONE ELASTOMERSCROSS-LINKED BY POLYPHENOLS

(71) Applicant: SHANDONG UNIVERSITY, Jinan (CN)

(72) Inventors: Dengxu Wang, Jinan (CN); Sen Kong, Jinan (CN); Shengyu Feng, Jinan (CN)

(73) Assignee: SHANDONG UNIVERSITY, Jinan (CN)

(*) Notice: Subject to any disclaimer, the term of this patent is extended or adjusted under 35 U.S.C. 154(b) by 0 days.

(21) Appl. No.: 17/447,771

(22) Filed: Sep. 15, 2021

(65) Prior Publication Data

US 2022/0041862 A1 Feb. 10, 2022

(30) Foreign Application Priority Data

Sep. 30, 2020 (CN) .......................... 202011063395.1

(51) Int. Cl.

| | |
|---|---|
| *C08L 83/04* | (2006.01) |
| *C08K 5/13* | (2006.01) |
| *C08L 83/08* | (2006.01) |
| *C08G 77/38* | (2006.01) |
| *C08K 3/013* | (2018.01) |
| *C08K 5/1545* | (2006.01) |
| *C08G 77/26* | (2006.01) |
| *C08K 5/053* | (2006.01) |
| *C08J 3/24* | (2006.01) |

(52) U.S. Cl.
CPC .............. *C08L 83/08* (2013.01); *C08G 77/26* (2013.01); *C08G 77/38* (2013.01); *C08K 3/013* (2018.01); *C08K 5/053* (2013.01); *C08K 5/13* (2013.01); *C08K 5/1545* (2013.01); *C08J 3/24* (2013.01); *C08L 2312/00* (2013.01); *C08L 2312/04* (2013.01)

(58) Field of Classification Search
CPC ... C08K 5/053; C08K 5/13; C08J 3/24; C08L 2312/04
See application file for complete search history.

(56) References Cited

FOREIGN PATENT DOCUMENTS

CN 112175210 A * 1/2021

OTHER PUBLICATIONS

"Tannic Acid as a Natural Crosslinker for Catalyst-free Silicone Elastomers from Hydrogen Bonding to Covalent Bonding" authored by Kong et al., and published in Frontiers in Chemistry published Oct. 18, 2021 and accessible at the link https://www.frontiersin.org/articles/10.3389/fchem.2021.778896/full.*

* cited by examiner

*Primary Examiner* — Marc S Zimmer
(74) *Attorney, Agent, or Firm* — CBM Patent Consulting, LLC

(57) ABSTRACT

The invention presents a preparation method of organic silicone elastomers cross-linked bypolyphenols, which comprises steps as follows: (1) Dissolve 15-250 parts (by mass) of amino-polysiloxanes in the organic solvents to get the amino-polysiloxanes solution; then, dissolve 1~20 parts of polyphenols in 1-60 parts of water to get the aqueous solution of polyphenols; mix the said two solutions, add 2-130 parts of reinforcement fillers, stir evenly, and then pour them into the mold. (2) Cure and cross-link the mold containing the mixed solutions at 80° C.-170° C. for a period of time, and cool it to room temperature to get the organic silicone elastomer.

11 Claims, 1 Drawing Sheet

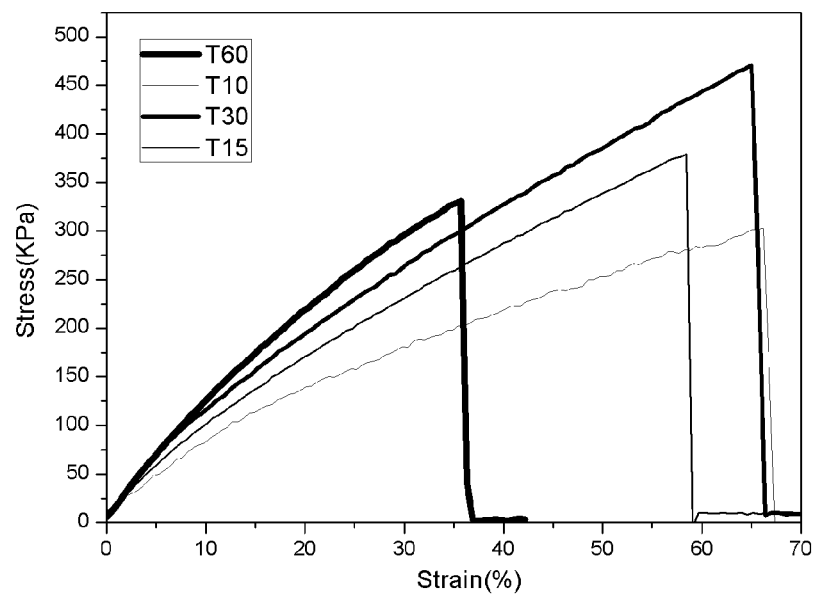

PREPARATION METHOD OF ORGANIC SILICONE ELASTOMERSCROSS-LINKED BY POLYPHENOLS

TECHNICAL FIELD

The invention is related toa preparation method of organic silicone elastomers and belongs to the technical field of organic silicon high-polymer materials.

BACKGROUND ART

Organic silicone elastomersarea kind of elastomer materials with polysiloxane as the fundamental structure. Compared with other elastomers, the organic silicone elastomerspossess high- and low-temperature resistance, electrical insulation, chemical stability, aging resistance, moisture resistance, and physiological inertia. As a high-performance flexible polymeric material, they have found extensive application prospects in the national defense armament manufacturing, construction, electronics industry and other fields.

The traditional preparation method of organic silicone elastomersselects organic silicone-based polymers (also called raw rubbers), cross-linking agents, fillers, and catalysts, etc., as ingredients and vulcanizes them under certain curing conditions (such as heating and illumination, etc.). During this process, the selection of cross-linking agents is of vital importance, which decides the cross-linked structures of the elastomers and further influences their mechanical properties. For now, limited by the crosslinking methods of organic silicone elastomers, the cross-linking agents used are mostly synthetic compounds or polymers and, in very rare cases, natural products, which makes it hard to satisfy the current requirements of "green chemistry" on organic silicone materials.

Polyphenols are a class of compounds with one and more phenolic hydroxyl groups. They have wide varieties and come from plants mainly, such as fruits, vegetables, grains, tea, etc. As very important compounds just like proteins, fats, nucleic acids, and carbohydrates, they are second only to sugars in terms of content in nature. Polyphenols have good properties of oxidation resistance, anti-inflammation, and antiviral activity, and almost all plants can produce certain amounts to protect against ultraviolet radiation, protect themselves and act as anthocyanins. Conforming to the concept of "green chemistry", the polyphenolsare a class of environment-friendly, pollution-free, and low-cost compounds. Recently, by taking advantages of the abundant phenolic hydroxyl groups in polyphenols, they have been widely used to prepare high-strength hydrogels or functional membranes. However, there is still no report on their use as cross-linking agents to prepare elastomers, especially organic silicone elastomers.

It meets the requirements of green chemistry to prepare organic silicone elastomers with green, harmless, non-toxic polyphenols from nature as cross-linking agents. In addition, compared with the traditional cross-linking method, this method uses amino-polysiloxanes as base polymers. No catalystsis required during the vulcanization and the curing condition is simple and easy to operate. Therefore, the invention is presented.

DESCRIPTION OF THE INVENTION

Given the shortcomings of the existing technologies, the invention presents a preparation method of organic silicone elastomers cross-linked by polyphenols according to the requirements of green chemistry. It uses amino-containing polysiloxanes as base polymers and polyphenols as cross-linking agents to prepare silicone elastomers by heating and regulates the mechanical properties of the elastomers by changing the ratio between the amino-polysiloxanes and the polyphenols. The elastomers obtained in the invention are flexible, evenly formed, and with good tensile properties.

The technical solution of the invention is as follows:

A preparation method of organic silicone elastomers, which comprises steps as follows:

With amino-polysiloxanes as base polymers and polyphenols as cross-linking agents, the organic silicone elastomers are prepared by heating the mixture for curing and cross-linking.

According to a preferred embodiment of the invention, the amino-polysiloxanes are dissolved in the organic solvents to serve as raw materials of base polymers, and polyphenols are dissolved in water to serve as raw materials of cross-linking agents.

According to a preferred embodiment of the invention, the mass ratio of the amino-polysiloxanes and the polyphenols is 200-250: 1-9, which is further preferred to be 220-225: 1-6. Under the condition of a constant amount of amino silicon oil, when the tannin content is low, the mechanical properties are poor, which is caused by the low cross-linking degree. As the amount of tannins increases, the mechanical properties of the elastomer will get better, which is because the amount increase of tannins improves the cross-linking and further improves the mechanical properties. However, when the amount of tannins is excessive, the mechanical properties of the elastomer will get worse because the excessive cross-linking of the elastomer reduces its mechanical properties, which causes embrittlement and reduces the elongation at break.

According to a preferred embodiment of the invention, the said amino-polysiloxane is with a structural formula as shown in Formula (I) or (II):

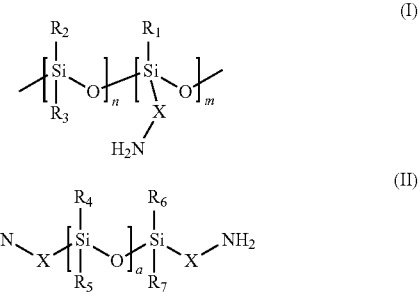

Wherein the structure as shown in Formula (I) or (II), the m: (n+m) ranges from 1:100 to 10:100; X is a linear, branched, or heteroatomic saturated hydrocarbon group from $C_1$ to $C_{10}$; $R_1$, $R_2$, $R_3$, $R_4$, $R_5$, $R_6$, and $R_7$ are any of linear or branched saturated alkyl groups and benzene rings of $C_1$ to $C_{10}$, linear or branched unsaturated hydrocarbyl groups of $C_2$ to $C_{10}$ containing one or more unsaturated double bonds, or saturated alkyl groups, benzene rings or unsaturated alkyl groups containing heteroatoms, and can either be identical to or different from each other;

According to a further preferred embodiment of the invention, the relative molecular mass of the amino-polysiloxane is 1,000-100,000 g/mol in Formula (I) and 1,000-50,000g/mol in Formula (II);

According to a further preferred embodiment of the invention, the said amino-polysiloxane has an amino molar content of 0.01-10%, which is most preferred to be 0.5-6%.

According to a preferred embodiment of the invention, the said polyphenols are one selected from tannins, resveratrol, quercetin, catechuic acid, taxifolin, morin, gallogen, epigallocatechin and epicatechin, or a combination of any two or more of them.

According to a preferred embodiment of the invention, the said organic solvents are methylbenzene, dichloromethane, tetrahydrofuran, trichloromethane and n-hexane and are most preferred to be methylbenzene; the mass ratio of the organic solvents and the amino polysiloxanes is 650-1300: 15-250.

According to a preferred embodiment of the invention, to improve the mechanical properties of the elastomer, reinforcement fillers will be added before curing and cross-linking; the reinforcement fillers are further preferred to be one from amongwhite carbon blacks, carbon blacks, nano calcium carbonates, kaolin, mica powders, feldspar powders, graphenes, ferric oxides and zinc oxides,or a combination of any two or more of them, and they aremost preferred to be fumed silica;

According to a preferred embodiment of the invention, the mass ratio of the reinforcement fillers and the amino polysiloxanes is 2-130:15-250.

According to a preferred embodiment of the invention, the curing and cross-linking temperature is 80° C.-170° C. and is further preferred to be 140° C.-160° C.;

According to a preferred embodiment of the invention, the curing and cross-linking duration is 1-4 h and is further preferred to be 1-3 h.

According to the invention, a preferred embodiment of the said organic silicone elastomer preparation method includes the following steps:

(1) Dissolve 15-250 parts (by mass) of amino-polysiloxanes in the organic solvents of methylbenzenes to get the amino-polysiloxane solution; then, dissolve 1~20 parts of polyphenols in 1-60 parts of water to get the aqueous solution of polyphenols; mix the said two solutions, stir them evenly, and then pour them into the mold.

(2) Cure and cross-link the mold containing the mixed solution at 80° C.-170° C. for 1-4 h, and then cool it to room temperature to get the organic silicone elastomer.

The beneficial effects of the invention are as follows:

1. The organic silicone elastomer preparation method in the invention is simple, fast, and in no need of any catalyst. The amino-polysiloxanes used are cheap, easy to get, safe and non-toxic. The polyphenols used as cross-linking agents are natural products and abundant in nature, have low costs, and will not cause environmental pollution.

2. The elastomers prepared in the invention are smooth in surfaces, evenly formed, flexible, and elastic. Featuring good mechanical properties, stable structures, good surface hydrophobicity, and certain elongation at break, they have excellent application prospects.

BRIEF DESCRIPTION OF THE FIGURES

Figure is the stress-strain curve diagram of Embodiments 1, 2 and 3.

DETAILED EMBODIMENTS

The invention is further described in combination with specific embodiments as follows, but the protection scope of the present invention is not limited to this.

Meanwhile, the experimental methods described in the following embodiments are all conventional methods unless otherwise specified; the said reagents and materials are commercially available unless otherwise specified.

Embodiment 1

In the embodiment, the components in parts by mass are as follows: 160 parts of poly (dimethylsiloxane-methylaminopropylsiloxane) with an amino molar content of 5.8% and the relative molecular weight of 30000g/mol, 60 parts of amino-terminated polydimethylsiloxane with the relative molecular mass of 10000g/mol, 860 parts of methylbenzene, 1 part of tannin and 20 parts of water. Mix the raw materials in the above parts by mass according to the steps previously described to prepare the organic silicone elastomers.

The specific operations are as follows:

Dissolve two kinds of aminopropylpolysiloxanes in the methylbenzene to get the homogeneous aminopropylpolysiloxane solution. Dissolve the tannin in water to get the homogeneous aqueous solution of tannins. Pour the aqueous solution of tannins into the aminopropylpolysiloxane solution, stir evenly, and then pour the well-mixed solution into the mold of teflon.

Cure the mold of teflon at 160° C. for 1 h, and cool it to room temperature to get the organic silicone elastomer. We can observe that the surface of the elastomer is fairly uniform. In Figure, T10 is the tensile testing curve of the embodiment. Due to the small addition amount of tannins, the cross-linking degree is not high, and the tensile strength is 300kPa.

Embodiment 2

In the embodiment, the components in parts by mass are as follows:160 parts of poly (dimethylsiloxane-methylaminopropylsiloxane) with an amino molar content of 5.8% and the relative molecular mass of 30000g/mol, 60 parts of amino-terminated polydimethylsiloxane with the relative molecular mass of 10000g/mol, 860 parts of methylbenzene, 1.5 parts of tannins, and 20 parts of water. Mix the raw materials in the above parts by mass according to the steps previously described to prepare the organic silicone elastomer.

The specific operations are as follows:

Dissolve two kinds of aminopropylpolysiloxanes in the methylbenzene to get the homogeneous aminopropylpolysiloxane solution. Dissolve the tannin in water to get the homogeneous aqueous solution of tannins. Pour the aqueous solution of tannins into the aminopropylpolysiloxane solution, stir evenly, and then pour the well-mixed solution into the mold of teflon.

Cure the mold of teflon at 150° C. for 1h, and cool it to room temperature to get the organic silicone elastomer. Wee can observe that the elastomer is surface hydrophobic. In Figure, T15 is the tensile testing curveof the embodiment. As the amount of tannins increases, the cross-linking degree improves, and the tensile strength is nearly 500 kPa, higher than that of T10.

Embodiment 3

In the embodiment, the components in parts by mass are as follows: 160 parts ofpoly (dimethylsiloxane-methylaminopropylsiloxane) with an amino molar content of 5.8% and the relative molecular mass of 30000g/mol, 60 parts of amino-terminated polydimethylsiloxane with the relative molecular mass of 10000g/mol, 860 parts of methylbenzene, 3 parts of tannins, and 20 parts of water. Mix the raw materials in the above parts by mass according to the steps previously described to prepare the organic silicone elastomer.

The specific operations are as follows:

Dissolve two kinds of aminopropylpolysiloxanes in the methylbenzene to get the homogeneous aminopropylpolysiloxane solution. Dissolve the tannin in water to get the homogeneous aqueous solution of tannins. Pour the aqueous solution of tannins into the aminopropylpolysiloxane solution, stir evenly and then pour the well-mixed solution into the mold of teflon.

Cure the mold of teflon at 150° C. for 1 h, and cool it to room temperature to get the organic silicone elastomer. We can observe that the elastomer is surface hydrophobic. In Figure, T30 is the tensile testing curve of the embodiment. As tannins was added in large quantities, slightly excessive cross-linking occurred, resulting in a slight decrease in tensile strength.

Embodiment 4

In the embodiment, the components in parts by mass are as follows: 160 parts of poly (dimethylsiloxane-methylaminopropylsiloxane) with an amino molar content of 5.8% and the relative molecular mass of 30000g/mol, 60 parts of amino-terminated polydimethylsiloxane with the relative molecular mass of 10000g/mol, 860 parts of methylbenzene, 44 parts of fumed silica, 1.5 parts of tannin, and 20 parts of water. Mix the raw materials in the above parts by mass according to the steps previously described to prepare the organic silicone elastomer.

The specific operations are as follows:

Dissolve two kinds of aminopropylpolysiloxanes in the methylbenzene to get the homogeneous aminopropylpolysiloxane solution. Dissolve the tannin in water to get the homogeneous aqueous solution of tannins. Pour the aqueous solution of tannins into the aminopropylpolysiloxane solution and then add the fumed silica; stir evenly and then pour the well-mixed solution into the mold of teflon.

Cure the mold of teflon at 160° C. for 2h, and cool it to room temperature to get the organic silicone elastomer.

Embodiment 5

In the embodiment, the components in parts by mass are as follows: 160 parts ofpoly (dimethylsiloxane-methylaminopropylsiloxane) with an amino molar content of 4.5% and the relative molecular mass of 11000g/mol, 60 parts of amino-terminated polydimethylsiloxane with the relative molecular mass of 10000g/mol, 860 parts of methylbenzene, 1 part of resveratrol, and 20 parts of water. Mix the raw materials in the above parts by mass according to the steps previously described to prepare the organic silicone elastomer.

The specific operations are as follows:

Dissolve two kinds of aminopropylpolysiloxanes in the methylbenzene to get the homogeneous aminopropylpolysiloxane solution. Dissolve the resveratrol in water to get the homogeneous aqueous solution of resveratrol. Pour the aqueous solution of resveratrol into the aminopropylpolysiloxane solution; stir evenly, and then pour the well-mixed solution into the mold of teflon.

Cure the mold of teflon at 160° C. for 3 h and cool it to room temperature to get the organic silicone elastomer.

Embodiment 6

In the embodiment, the components in parts by mass are as follows: 165 parts of poly (dimethylsiloxane-methylaminopropylsiloxane) with an amino molar content of 4.5% and the relative molecular mass of 11000 g/mol, 63 parts of amino-terminated polydimethylsiloxane with the relative molecular mass of 10000g/mol, 860 parts of methylbenzene, 1 part of gallogen, and 20 parts of water. Mix the raw materials in the above parts by mass according to the steps previously described to prepare the organic silicone elastomer.

The specific operations are as follows:

Dissolve two kinds of aminopropylpolysiloxanes in the methylbenzene to get the homogeneous aminopropylpolysiloxane solution. Dissolve the gallogen in water to get the homogeneous aqueous solution of gallogen. Pour the aqueous solution of gallogen into the aminopropylpolysiloxane solution; stir evenly, and then pour the well-mixed solution into the mold of teflon.

Cure the mold of teflon at 160° C. for 3 h and cool it to room temperature to get the organic silicone elastomer.

Embodiment 7

In the embodiment, the components in parts by mass are as follows: 163 parts of poly (dimethylsiloxane-methylaminopropylsiloxane) with an amino molar content of 4.5% and the relative molecular mass of 11000 g/mol, 60 parts of amino-terminated polydimethylsiloxane with the relative molecular mass of 10000 g/mol, 860 parts of methylbenzene, 3 parts of tannins, and 20 parts of water. Mix the raw materials in the above parts by mass according to the steps previously described to prepare the organic silicone elastomer.

The specific operations are as follows:

Dissolve two kinds of aminopropylpolysiloxanes in the methylbenzene to get the homogeneous aminopropylpolysiloxane solution. Dissolve the tannins in water to get the homogeneous aqueous solution of tannins. Pour the aqueous solution of tannins into the aminopropylpolysiloxane solution and then add the fumed silica; stir evenly and then pour the well-mixed solution into the mold of teflon.

Cure the mold of teflon at 150° C. for 2 h and cool it to room temperature to get the organic silicone elastomer.

Embodiment 8

In the embodiment, the components in parts by mass are as follows: 167 parts of poly (dimethylsiloxane-methylaminopropylsiloxane) with an amino molar content of 2.2% and the relative molecular mass of 15000 g/mol, 60 parts of amino-terminated polydimethylsiloxane with the relative molecular mass of 10000 g/mol, 860 parts of methylbenzene, 3 parts of tannins, and 20 parts of water. Mix the raw materials in the above parts by mass according to the steps previously described to prepare the organic silicone elastomer.

The specific operations are as follows:

Dissolve two kinds of aminopropylpolysiloxanes in the methylbenzene to get the homogeneous aminopropylpolysiloxane solution. Dissolve the tannins in water to get the homogeneous aqueous solution of tannins. Pour the aqueous solution of tannins into the aminopropylpolysiloxane solution; stir evenly, and then pour the well-mixed solution into the mold of teflon.

Cure the mold of teflon at 160° C. for 2 h, and cool it to room temperature to get the organic silicone elastomer.

COMPARATIVE EXAMPLE 1

As described in Embodiment 3, provided that: 6 parts of tannins are used in the comparative example. The tensile property of the comparative is as shown in T60 of Figure. As can be seen, the tensile strength and elongation at break of T60 are obviously lower than those of T30, which evidences that the mechanical properties continue to decline as the phenomenon of excessive cross-linking gets worse.

What is claimed is:

1. A preparation method of organic silicone elastomers, which comprises steps as follows:
    with amino-polysiloxanes as base polymers and polyphenols as cross-linking agents, the organic silicone elastomers are prepared by heating the mixture for curing and cross-linking;
    the mass ratio of the amino-polysiloxanes and the polyphenols is 200-250: 1-9;
    the said polyphenols are one selected from tannins, resveratrol, quercetin, catechuic acid, taxifolin, morin, gallogen, epigallocatechin and epicatechin, or a combination of any two or more of them;
    the curing and cross-linking temperature is 80° C.-170° C., and the duration is 1-4 h.

2. The said preparation method of organic silicone elastomers according to claim 1, characterized in that the amino-polysiloxanes are dissolved in the organic solvents to serve as raw materials of base polymers, and polyphenols are dissolved in water to serve as raw materials of cross-linking agents.

3. The said preparation method of organic silicone elastomers according to claim 1, characterized in that the mass ratio of the amino-polysiloxanes and the polyphenols is 220-225: 1-6.

4. The said preparation method of organic silicone elastomers according to claim 1, characterized in that the said amino-polysiloxane is with a structural formula as shown in Formula (I) or (II):

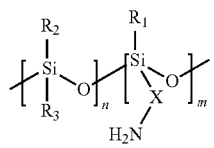

(I)

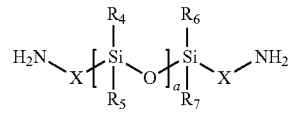

(II)

where, in the structure as shown in Formula (I) or (II), the m: (n+m) ranges from 1:100 to 10:100; X is a linear, branched, or heteroatomic saturated hydrocarbon group from $C_1$ to $C_{10}$); $R_1$, $R_2$, $R_3$, $R_4$, $R_5$, $R_6$, and $R_7$ are any of linear or branched saturated alkyl groups and benzene rings of $C_1$ to $C_{10}$, linear or branched unsaturated hydrocarbyl groups of $C_2$ to $C_{10}$ containing one or more unsaturated double bonds, or saturated alkyl groups, benzene rings or unsaturated alkyl groups containing heteroatoms, and can either be identical to or different from each other.

5. The said preparation method of organic silicone elastomers according to claim 4, characterized in that the relative molecular mass of the amino-polysiloxane is 1,000-100,000 g/mol in Formula (I) and 1,000-50,000 g/mol in Formula (II).

6. The said preparation method of organic silicone elastomers according to claim 4, characterized in that the said amino-polysiloxane has an amino molar content of 0.01-10%.

7. The said preparation method of organic silicone elastomers according to claim 2, characterized in that the said organic solvents are methylbenzene, dichloromethane, tetrahydrofuran, trichloromethane or n-hexane.

8. The said preparation method of organic silicone elastomers according to claim 2, characterized in that the mass ratio of the organic solvents and the amino polysiloxanes is 650-1300:15-250.

9. The said preparation method of organic silicone elastomers according to claim 1, characterized in that reinforcement fillers will be added before curing and cross-linking.

10. The said preparation method of organic silicone elastomers according to claim 9, characterized in that the reinforcement fillers are white carbon blacks, carbon blacks, nano calcium carbonates, kaolin, mica powders, feldspar powders, graphenes, ferric oxides and zinc oxides, or a combination of any two or more of them.

11. The said preparation method of organic silicone elastomers according to claim 9, characterized in that a mass ratio of the reinforcement fillers and the amino polysiloxanesis 2-130: 15-250.

* * * * *